US010962167B2

(12) United States Patent
Karman et al.

(10) Patent No.: US 10,962,167 B2
(45) Date of Patent: Mar. 30, 2021

(54) SPHERICAL HEAD ASSEMBLY FOR ATTACHING AN OPTICAL AND/OR ELECTRONIC DEVICE TO A STANDER

(71) Applicants: Balazs Karman, Zsombo (HU); Laszlo Novak, Balatonalmadi (HU)

(72) Inventors: Balazs Karman, Zsombo (HU); Laszlo Novak, Balatonalmadi (HU)

( * ) Notice: Subject to any disclaimer, the term of this patent is extended or adjusted under 35 U.S.C. 154(b) by 0 days.

(21) Appl. No.: 15/773,068

(22) PCT Filed: Nov. 8, 2016

(86) PCT No.: PCT/HU2016/050054
§ 371 (c)(1),
(2) Date: May 2, 2018

(87) PCT Pub. No.: WO2017/081502
PCT Pub. Date: May 18, 2017

(65) Prior Publication Data
US 2018/0320813 A1 Nov. 8, 2018

(30) Foreign Application Priority Data

Nov. 9, 2015 (HU) .................................. 1500527
Dec. 18, 2015 (HU) .................................. 1500639

(51) Int. Cl.
*F16M 11/14* (2006.01)
*F16C 11/10* (2006.01)
*G03B 17/56* (2021.01)

(52) U.S. Cl.
CPC ........... *F16M 11/14* (2013.01); *F16C 11/106* (2013.01); *G03B 17/561* (2013.01);
(Continued)

(58) Field of Classification Search
CPC .... F16C 11/106; F16C 11/0642; F16M 11/14; F16M 11/2078; Y10T 403/32565
See application file for complete search history.

(56) References Cited

U.S. PATENT DOCUMENTS 206,393 A * 7/1878 Ellinger ................. F16M 11/14
403/114
1,319,393 A * 10/1919 Hollis .................... F16M 11/14
248/288.31
(Continued)

FOREIGN PATENT DOCUMENTS

WO 2014195745 A1 11/2014
WO WO-2014195745 A1 * 12/2014 ........... F16M 11/125

*Primary Examiner* — Bradley Duckworth
(74) *Attorney, Agent, or Firm* — Handal & Morofsky; Anthony H. Handal

(57) ABSTRACT

Spherical head assembly for attaching an optical and/or electronic device to a stander with an adjustability in at least two degrees of freedom, which has a first part that can be releasably connected to the stander and a second part which is provided with a support element for the releasable connection of the device to be held thereby, and one of the two parts is a spherical head (20, 100) that has a body (21, 99) which has at least in part a spherical shape, and the other part comprises a cavity formed as a spherical segment which encircles the spherical head (20, 100) at least in part and is fitted thereto, and comprises an adjusting means for coupling the two parts together and releasing the same coupling, and in the initial position of intended use the held device is adjusted in horizontal or almost horizontal position. In the second part a groove (24, 108) is provided that has a vertical central plane and extends along the largest diameter of the spherical segment, and on the first part a circularly symmetrical stud (25, 103) is provided at a position that corresponds to the vertical diameter of the spherical segment and the stud (25, 103) can be fitted in the groove (24, 108), and in the fitted position the stud (25, 103) allows the displacement of the two parts along the groove (24, 108), and the stud (25, 103) allows the turning of the two coupled spherical fitted segments around the vertical axis of the stud (25, 103) at each of the adjusted positions, and the adjusting
(Continued)

means is arranged on that one of the two parts which has the spherically shaped cavity, and when the position of two parts are fixed the adjusting means presses the cavity to the spherical body (21, 99).

16 Claims, 12 Drawing Sheets

(52) U.S. Cl.
CPC . *F16M 2200/022* (2013.01); *F16M 2200/024* (2013.01); *F16M 2200/041* (2013.01)

(56) References Cited

U.S. PATENT DOCUMENTS

| | | | | |
|---|---|---|---|---|
| 3,958,904 | A * | 5/1976 | Rusbach | F16C 11/106 403/90 |
| 4,621,782 | A * | 11/1986 | Carlson | F16M 11/10 248/183.3 |
| 4,986,688 | A * | 1/1991 | Tuan | F16C 11/0661 403/127 |
| 5,284,397 | A * | 2/1994 | Hayashi | B60S 1/24 403/114 |
| 5,871,186 | A * | 2/1999 | Bothe | F16C 11/069 248/178.1 |
| 5,957,445 | A * | 9/1999 | Hagman | B23Q 1/545 269/75 |
| 6,249,983 | B1 * | 6/2001 | Wright | G01C 9/26 33/286 |
| 6,767,153 | B1 * | 7/2004 | Holbrook | F16C 11/0604 403/115 |
| 7,387,284 | B2 * | 6/2008 | Chang | F16C 11/106 108/7 |
| 8,132,291 | B2 * | 3/2012 | Tsai | F16C 11/0604 16/224 |
| 10,197,215 | B2 * | 2/2019 | Benvenisti | H01Q 1/1207 |
| 2004/0114992 | A1 * | 6/2004 | Ronsheim | F16C 11/106 403/137 |
| 2008/0210832 | A1 * | 9/2008 | Speggiorin | F16M 11/14 248/183.1 |
| 2012/0321374 | A1 * | 12/2012 | Ray | B25B 23/0014 403/111 |
| 2016/0076583 | A1 * | 3/2016 | Karai | F16M 11/125 248/278.1 |
| 2018/0106416 | A1 * | 4/2018 | Karai | F16M 11/14 |
| 2019/0003531 | A1 * | 1/2019 | Yoon | F16D 3/2237 |

* cited by examiner

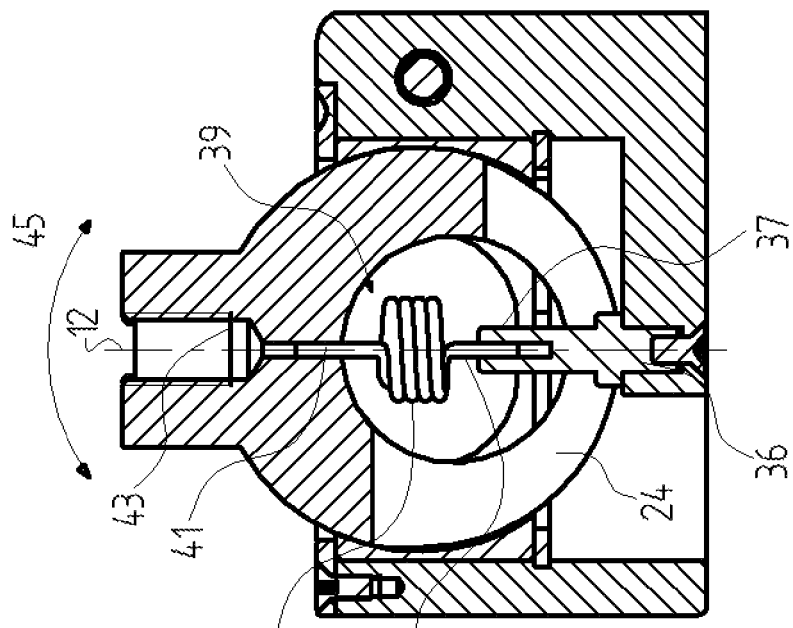
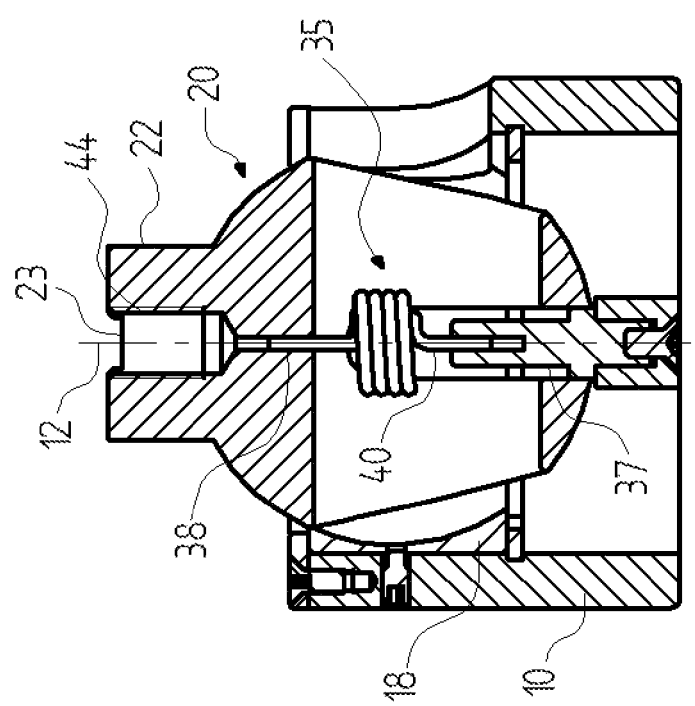

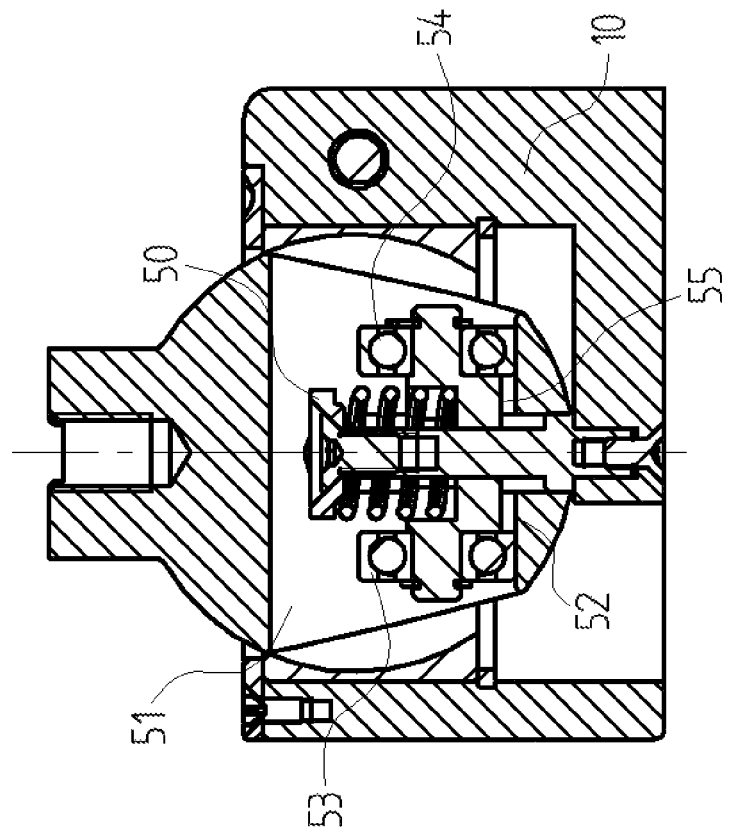
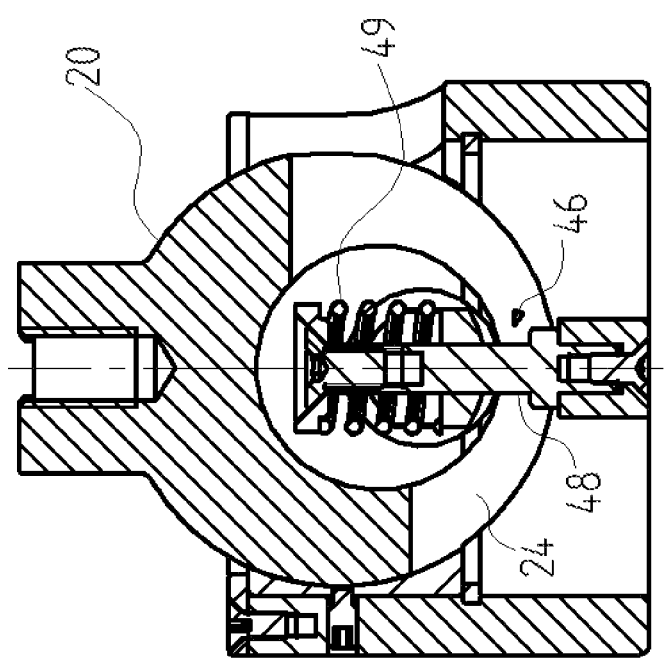

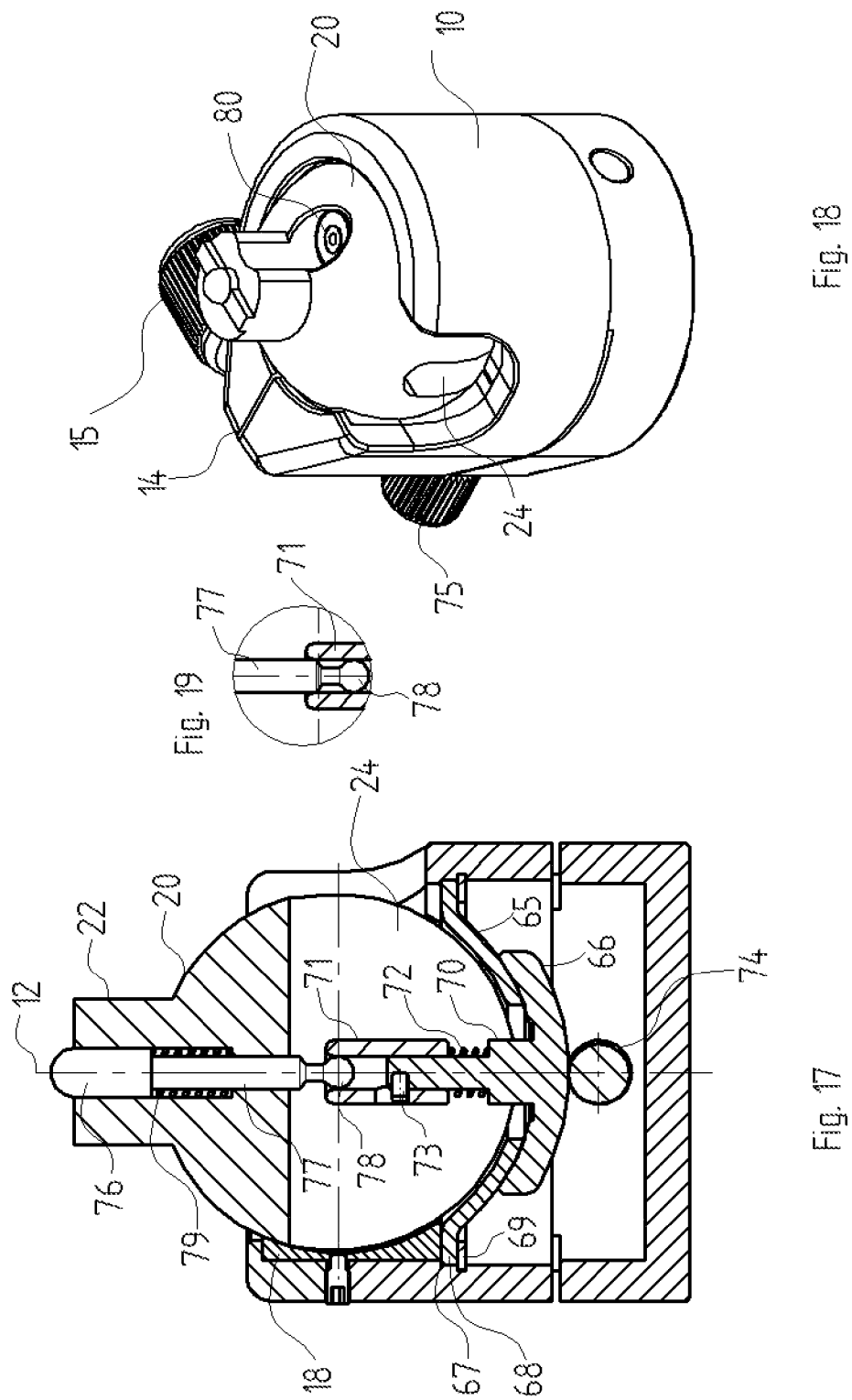

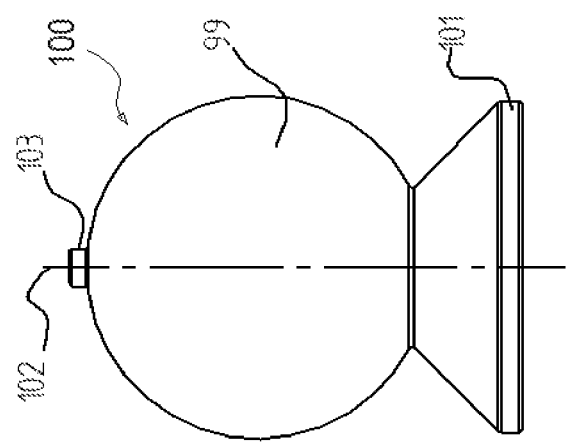
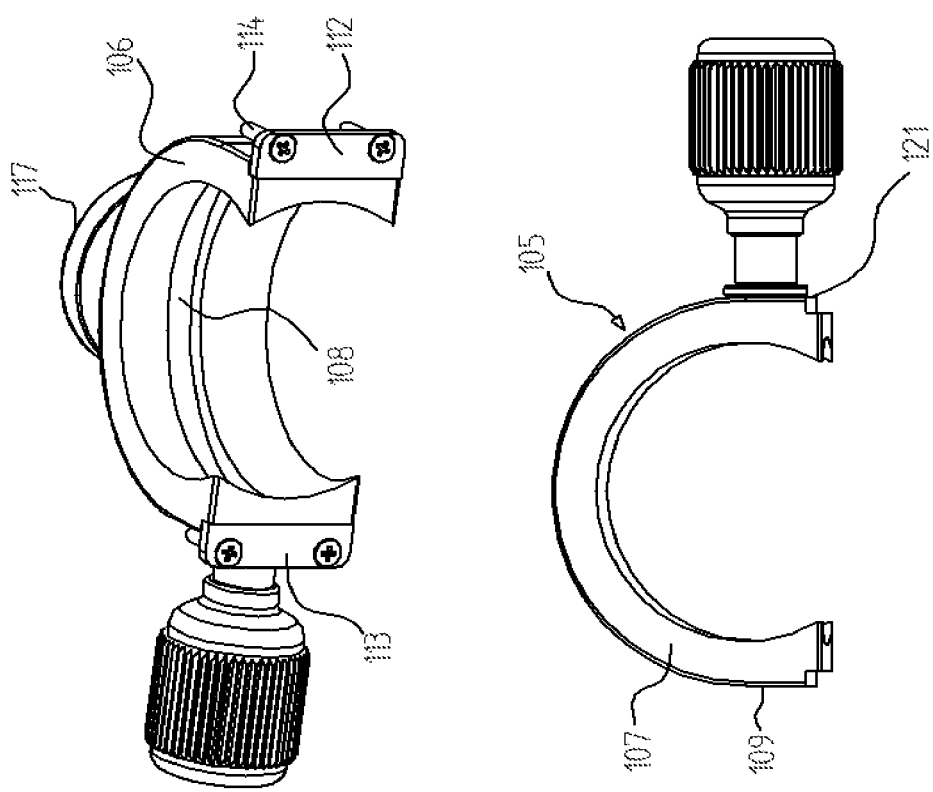

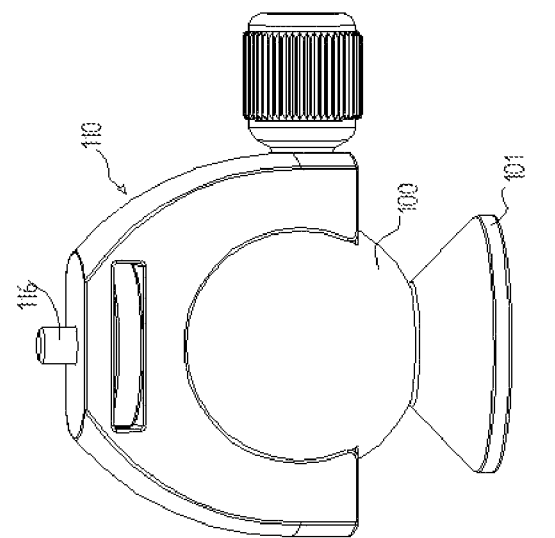
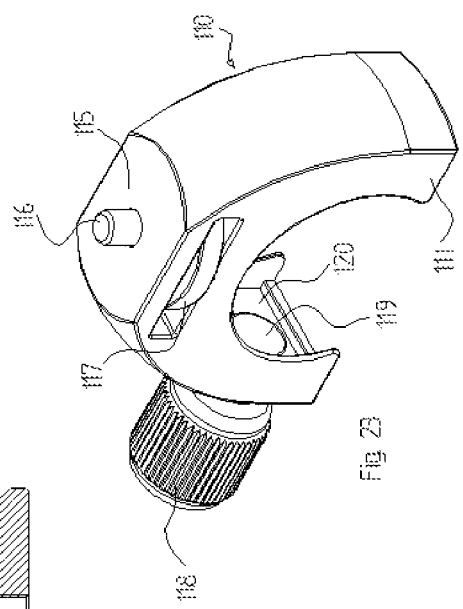
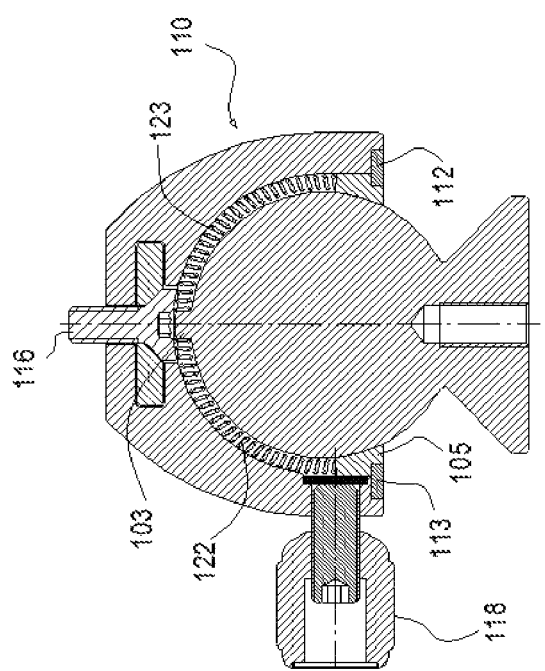

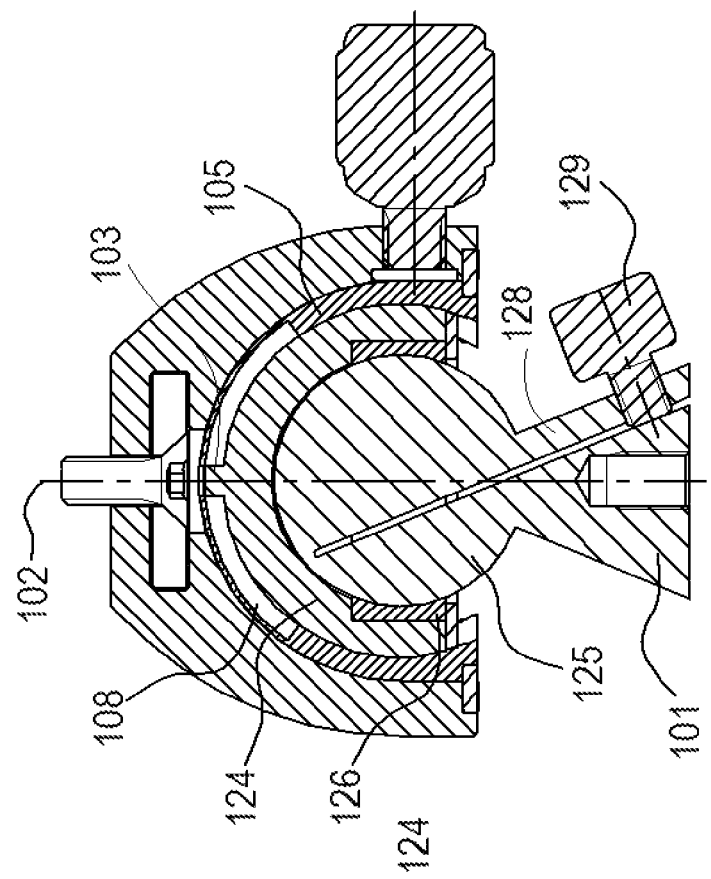
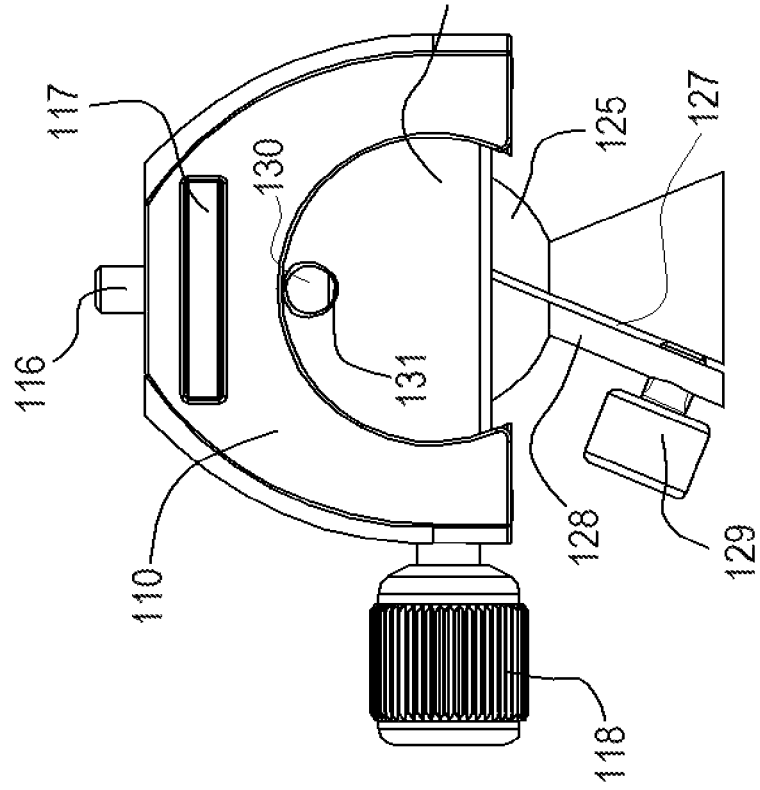

SPHERICAL HEAD ASSEMBLY FOR ATTACHING AN OPTICAL AND/OR ELECTRONIC DEVICE TO A STANDER

The invention relates to a spherical head assembly for attaching an optical and/or electronic device to a stander that has adjustability with at least two degrees of freedom, wherein the spherical head assembly has a first part which can be connected to the stander and fixed thereto in a releasable way and a second part which is provided with a support element for the releasable connection and holding of the device. The spherical assembly according to the invention can be used primarily for the holding and positioning of optical devices e.g. cameras, video and film recorders and projectors, and which are designed for being held on a kind of stander typically on a tripod.

With a more accurate approach out of the two mentioned parts of the spherical head assembly one part is constituted by a spherical head which has a body formed at least in part as a sphere, and the other part comprises a cavity designed as a spherical segment which fits to the spherical body and at least partially surrounds it, and the spherical head assembly comprises and adjustment means which can couple the two parts to each other and can also release this coupling, and in use the initial position of the device is horizontal or nearly horizontal.

In the present specification the "vertical" and "horizontal" definitions have special role, and under these directions two mutually normal directions are understood, which need not be exactly vertical or horizontal in the geometric sense, but they designate if a device e.g. a camera is placed on a tripod, then the basic plane of the camera is brought to a nearly horizon position in one conventional way, because in case of making pictures the expected visual sensation needs the existence of a horizon. Such an adjusted position is referred to as initial position, and during use the camera should be adjusted in the direction as required by the user. In most of the cases one has to ensure a full turning of the camera around a vertical axis, and the tilting around a horizontal axis. The tilting is required in most of the cases only in a predetermined angular range. It is an important requirement that during such adjustments the horizon should be left unchanged, i.e. the camera should not be adjustable around an axis which is normal to both the vertical and horizontal axes because thereby the horizon would also change. Therefore such a way of adjustment is referred to as adjustment with two degrees of freedom. Although this is one of the most important requirements, it might happen that the user till wishes to give up the horizon and requires adjustment in all possible directions. This possibility is difficult to be ensured in systems providing two degrees of freedom.

It might also happen that in given cases the device should be quickly turned by 90° (required often when portrait shots are made) and the spherical head assembly that holds the device should be prepared to satisfy this requirement.

A wide variety of such structures is known and they are available in commerce. These are described and the associated problems are summarized in detail in the publication WO2014/195745 which at the same time provides a solution to the position adjustment of such devices following the adjustment of the base plane of the spherical head structure into horizontal direction.

The referred document ensures first that in case of any position of the stander support the horizontal initial position can be adjusted and fixed in a first step, and then a second mechanism ensures the movements with two degrees of freedom with the previously described limitation. In one embodiment a vertical groove is provided on the spherical head used for adjustment, and a snug is inserted in the groove that allows turning of the head around the vertical axis. That solution represents a substantial step forward compared to other prior solutions at the same time it needs some kind of perfections from a few aspects.

A problem of that solution lies in that a slot extends through almost the whole body of the guided spherical head that divides the body into two halves and the fixing of the adjusted position and the release of that position takes place by pressing the two halves apart from each other. This kind of fixing is connected with several drawbacks of which one lies in the small size of the sphere compared to the housing, and small sizes require the use of high pushing forces which imposes technical difficulties in solving the adjustment and negatively influences the fine adjustability. A further relates problem is that during the tearing the halves apart from each other the shape of the sphere will depart from the ideal one (i.e. gets distorted), therefore its turning in all direction will not be sufficiently smooth and the force required for the adjustment will be dependent on the actual angular position.

A further problem lies in that the presence of the slot limits the freedom how the interior of the spherical body can be designed and the placement of any possible required element in the spherical body.

A different problem that is most apparent for the users lies in that the slot of the spherical head is normal to the optical axis of the camera. When the sphere is pressed outward or loosened by the adjusting bolt, the camera or any other optical device fixed above the sphere will get slightly lurched in front-rear direction (i.e. it will nod) depending on whether the bolt is pressed or released. The extent of this phenomenon will be more or less visible depending on the extent of the seeing angle of the optic used.

In case the size and weight of the device held by the head assembly is fairly high then during tilting around the horizontal axis the device will tend to tilt in forward or backward direction under the effect of its own weight to an extent that depends on the tilting angle, and this tilting torque renders the fine position-adjustment difficult therefore there is a need to a solution which can at least partially compensate such a tilting torque.

There are certain users who require beside the aforementioned adjustability according to two degrees of freedom that in given cases the system should make possible an adjustment in all directions which has three degrees of freedom, i.e. the limitation of the movement to two degrees of freedom should be given up. In case of such a demand it is an important requirement that the change from the limited adjustability with 2 degrees of freedom to the free adjustability should be easy and simple.

A further problem has a more economic nature, namely owing to the possibility of leveling the size of the referred prior device is large because the spherical head is surrounded by a relatively large cup which arranged in a separate housing. There are several standers commercially available which are equipped with a means that can adjust the supporting plane into horizontal direction, and when such standers are used the suggested construction is too large in size and at the same time it is too expensive, therefore there is no need for the integrated leveling function in the horizontal plane.

In case there was still a need for the adjustment of the base plane (for leveling), the solution provided in the above referred publication has too large size, weight and price, i.e. there is a need for providing the same function in a simpler way.

In the solutions referred to so far the housing of the spherical assembly was connected to the support stander, and the releasable connection of the held optical and/or electronic device was solved at the neck made on the spherical head. A spherical assembly allowing adjustment in three dimensions is known in which the roles of the housing and the neck are interchanged and a neck-like projection of the spherical head is connected to the stander, and the optical device is held by a support connected to a bracket positioned on the spherical head and the position of the bracket can be adjusted in all directions. Such a solution is published e.g. in the document U.S. Pat. No. 5,871,186. In certain applications this design which is "inverse" compared to the widely used designs is preferred therefore the use of this design can also be regarded as widely spread. In such an "inverse" design the positioning of the base plane is not ensured i.e. the decrease of the degree of freedom from three to two in such a way that in each adjusted position a horizontal line can be fitted to the supporting base plane.

The primary task of the invention is to provide a spherical head assembly for the connection of an optical and/or electronic device to a stander with an adjustability of at least two degrees of freedom with limiting elements in a vertical plane, which is more advantageous than the referred publication WO2014/195745 concerning ease of use, size, weight and manufacturing costs, furthermore in which the role of the two main parts of the assembly can be interchanged within certain limits.

A secondary task of the invention is in addition to solving the first task is to provide an adjustment possibility in which the user can decide whether he wishes to adjust the device with two or three degrees of freedom and can carry out the change between these possibilities in an easy way.

A further task of the invention is the at least partial compensation of the tilting torque when the device is tilted.

Finally, a further task of the invention is to solve the adjustment of the base plane of the assembly without the use of the large and heavy system described in the publication WO2014/195745, namely without the use of a housing, a shell and the spherical head, namely in which the assembly has only the two aforementioned main parts.

The here defined multiple tasks are all solved by the invention in a simple and efficient way, and the structure thereof is defined in detail in the accompanying claims.

The solution according to the invention will now be described in connection with examples, in which reference will be made to the accompanying drawings. In the drawing.

Figure 6:
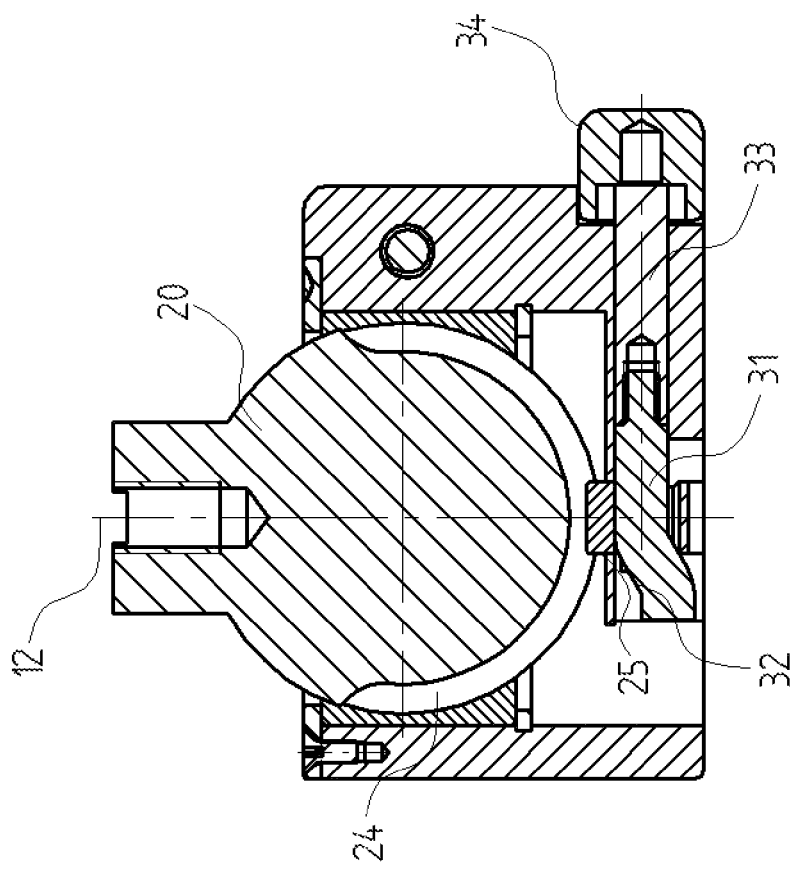
Figure 5:
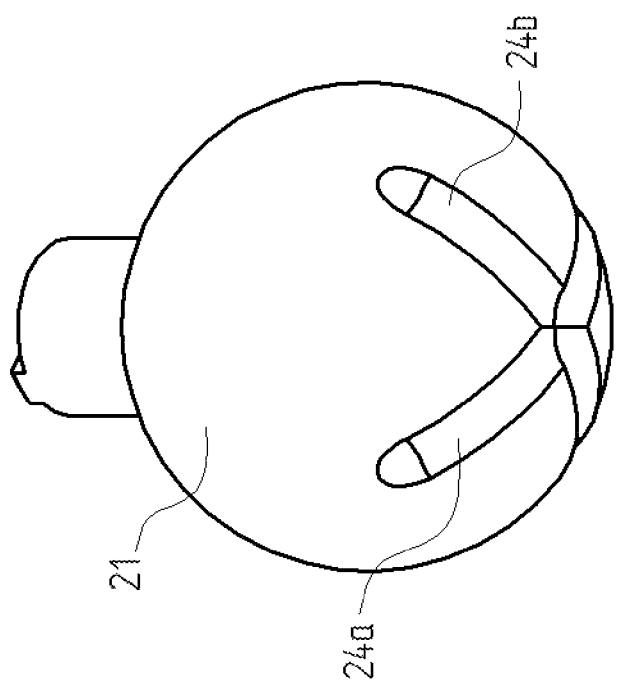
Figure 8:
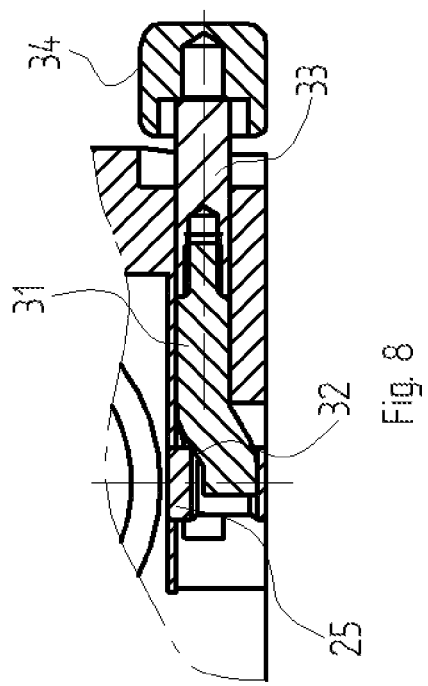
Figure 7:
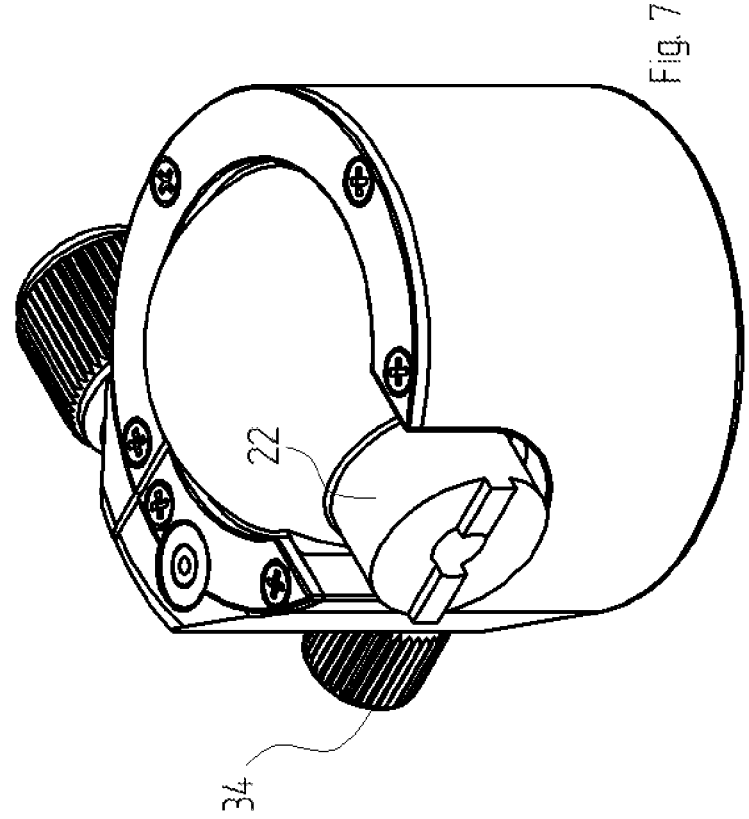
Figure 9:
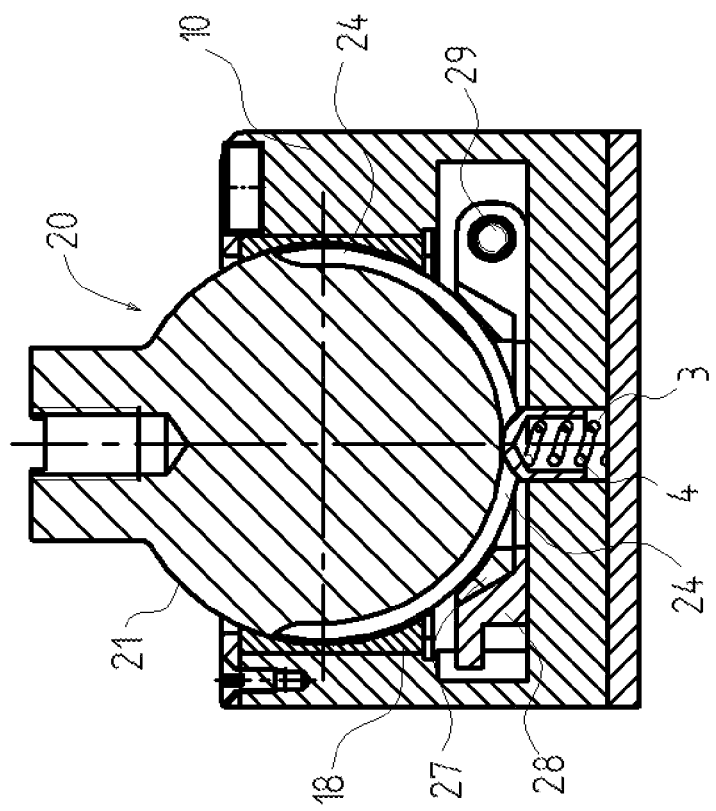
Figure 10:
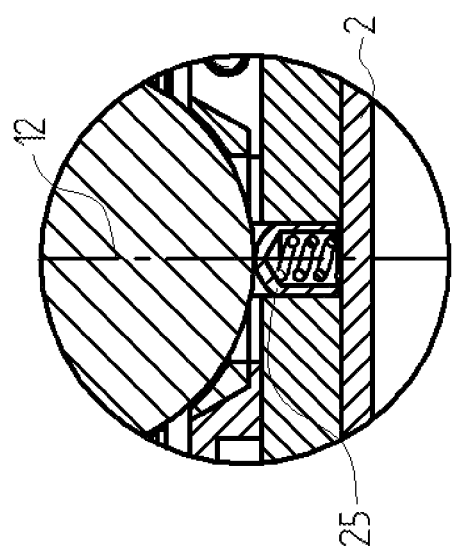
Figure 14:
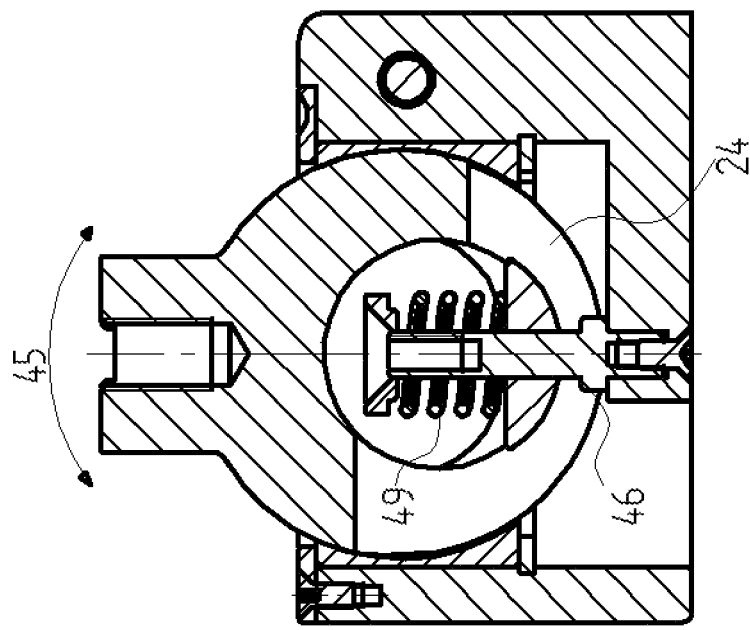
Figure 13:
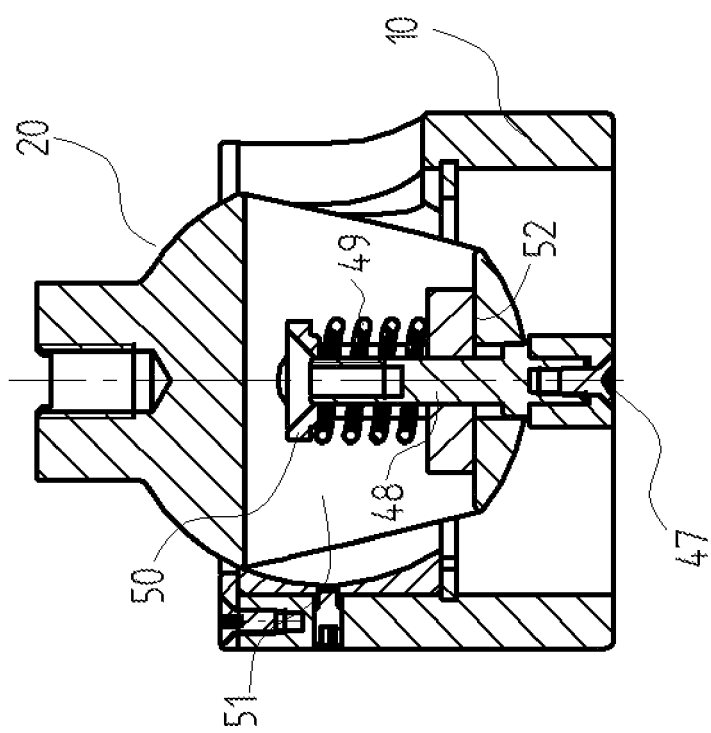

FIG. 5 is the perspective view of the body 21 of a spherical head 20 which has two grooves 24a and 24b;

FIG. 6 shows the sectional view of an embodiment which can be adjusted either with 2 or 3 degrees of freedom;

FIG. 7 shows the perspective view of the embodiment shown in FIG. 6;

FIG. 8 is the enlarged sectional view of a detail of the adjusting device shown in FIG. 6;

FIG. 9 shows the sectional view of an embodiment capable of changing the degree of freedom;

FIG. 10 shows an enlarged sectional view of a detail of the embodiment shown in FIG. 9;

FIG. 11 is the sectional view of an embodiment that can ensure a counter torque;

FIG. 12 is a sectional view similar to FIG. 11 but using a normal section plane;

FIG. 13 is the sectional view of a further embodiment ensuring a counter torque;

FIG. 14 is the sectional view similar to FIG. 13 taken by a normal section plane;

FIG. 15 shows the sectional view of an improved embodiment of the previous one;

FIG. 16 is the sectional view similar to FIG. 15 taken by a normal section plane;

FIG. 17 shows the sectional view of an embodiment of the invention that enables leveling;

FIG. 18 shows the perspective view of the embodiment shown in FIG. 17;

FIG. 19 is the enlarged sectional view of a detail of the embodiment shown in FIG. 17;

FIG. 20 shows the elevation view of the spherical head at a further embodiment;

FIG. 21 is the perspective view of the bracket of the embodiment shown in FIG. 20;

FIG. 22 shows the bracket seen from a different direction;

FIG. 23 shows the perspective view of the support and adjusting assembly;

FIG. 24 shows the elevation view of the assembled spherical head;

FIG. 25 is the sectional view of the embodiment shown in FIG. 24 which can provide a counter torque;

FIG. 26 is the elevation view of the version of the previous embodiment which is also capable of leveling; and FIG. 27 is the sectional view of the embodiment shown in FIG. 26.

Figure 2:
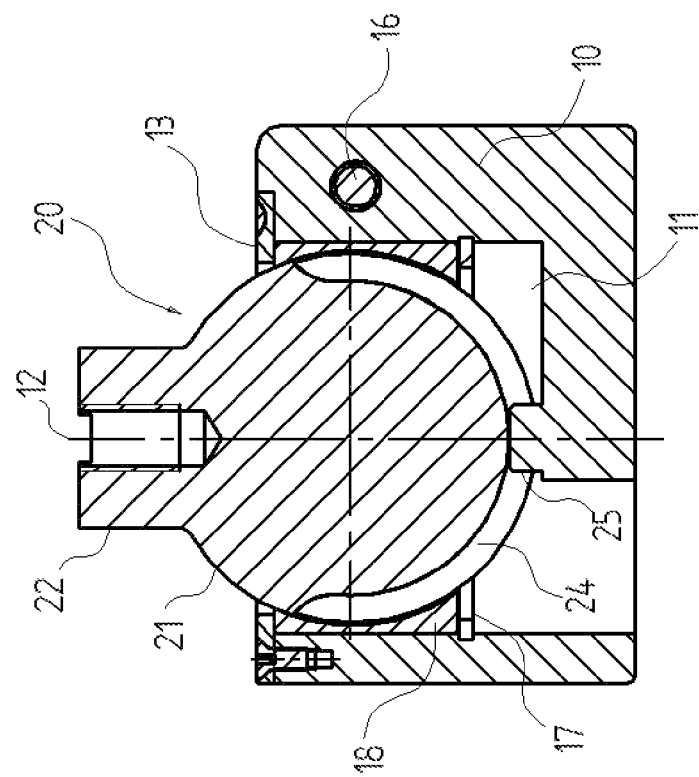
FIG. 2 is the sectional view of the embodiment shown in FIG. 1.
Figure 1:
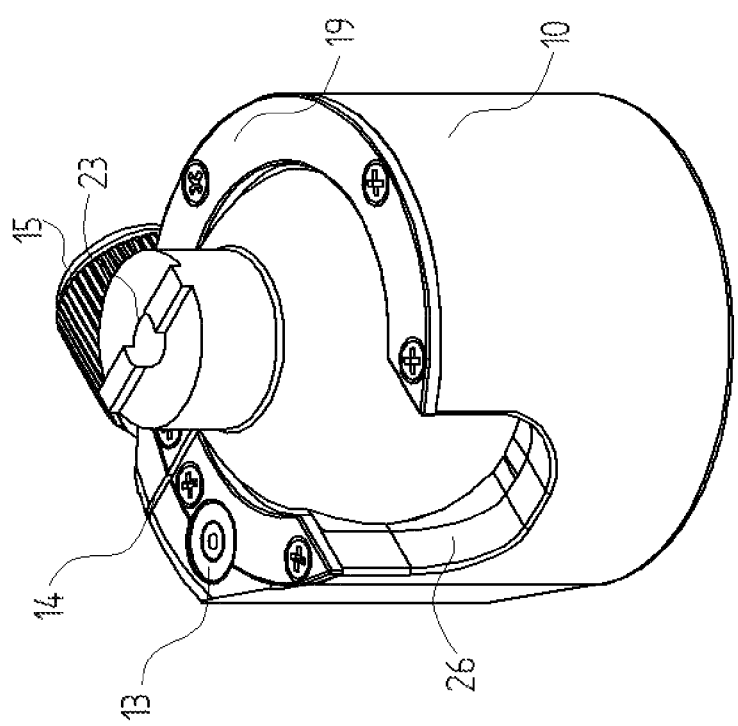
FIG. 1 shows the perspective view of a first embodiment.

FIGS. 1 and 2 show the first embodiment of the spherical head according to the invention which have an upright housing 10 with a vertical axis and the in the interior thereof a cylindrical cavity 11 is provided shown in the sectional view of FIG. 2, and axis 12 of the cavity 11 is not necessarily coincides with the axis of the housing 10. The reason of this lies in that in a preferred embodiment the wall thickness of the housing 10 can be increased in a given angular range, and in the upper part of the thicker portion a leveling bubble 13 can be placed that assists in labeling. FIGS. 1 and 2 show such a design. The wall of the housing 10, preferably at the middle of the thicker portion comprises a slot 14 that extends in parallel with the axis 12, and the slot can 14 be compressed by an adjusting bolt that has a large knurled adjusting head 15 and a threaded spindle 16 that can be seen in the sectional view of FIG. 2 which engages a threaded nut provided in the wall of housing 10.

In the hollow part of the cylindrical cavity 11 a guiding insert 18 is placed which can be pulled in the cavity from above and supported at the bottom by a support ring 17, and the guiding insert 18 is made preferably by Teflon® or a similar plastic material with small friction coefficient. In the interior of the guiding insert 18 a spherical cavity is provided. Along the mantle of the guiding insert 18 a slot can be provided (not shown in the drawing) along which the guiding insert 18 can be slightly opened. At the top of the guiding insert 18 a closure ring 19 is threaded to the upper rim of the housing 10 that prevents its removal.

In the hollow interior of the guiding insert 18 the spherical body 21 of a spherical head 20 is arranged that is form-fitted to the spherical cavity and the body 21 is guided in the cavity for movement with two degrees of freedom as it will be explained below. At the upper part the spherical head 20 has a neck 22 with predetermined length, and it has an upper threaded bore to which a connection element 23 can be attached that has the task of attaching and holding the optical or electro-optical device (camera, video recorder or other similar device) so that its position should be adjustable by the assembly.

In the middle of the body 21 of the spherical head 20 a groove 24 is provided that has a central line falling in the equatorial plane of the sphere and it has parallel walls and a predetermined depth and length. The task of the groove 24 is to limit the displacement of the spherical head 20. In the sectional view of FIG. 2 it can be observed that from the bottom of the housing 10 a short cylindrical stud 25 is extending out and fits in the groove 24. The axis of the stud 25 falls in the axis 12 of the cylindrical cavity 11. Because of the presence of the stud 25 the spherical head 20 can be turned around an axis normal to the axis of the neck (which is horizontal in the present case) only in the direction defined by the planar walls of the groove 24 and only with the range defined by the length of the groove 24. The turning around the axis 12 which is normal to the previous axis is possible owing to the cylindrical shape of the stud 25, and this turning is possible in any tilted position of the axis of the neck 22 because the axis of the stud 25 falls in any tilted position of the spherical head 20 in one of the equatorial diameters.

A characteristic of the guiding provided in this way is that in any displacement of the neck 22 and the connected device the base position (preferably horizontal) of the device remains unchanged. This has naturally the condition that the upper plane of the support (tripod) that determines the base plane of the bottom of the housing 10 and which does not form part of the present invention be adjustable, and the role of the leveling bubble 13 is only the assistance in adjusting the base plane to horizontal position and to check this position.

In FIG. 1 it can be observed that at the side of the housing 10 a U-shaped vertical opening 26 is provided, wherein the arced bottom profile of the U-shape makes it possible that the spherical head 20 can be tilted till reaching the horizontal position, i.e. when the axis of the neck 22 becomes horizontal, the opening 26 just abuts the neck 22. This design can be important in case of shots made in portrait position where the tilting of the camera by 90° degrees is required. This tilting is possible only when the neck 22 of the spherical head 20 is in the angular position that corresponds to that of the opening 26.

The spherical head 20 can be adjusted within the afore mentioned degrees of freedom in any position by means of the large threaded adjusting head 15, then the fastening of the adjusting head 15 compresses the slot 14 and in this way the housing 10 compresses the guiding insert 18 and the pressing force applied in this way fixes the position of the spherical head 20 in the adjusted position. The position fixing by the slot in the housing is advantageous because the resilience of the housing can provide a fine adjustment, because by a slight loosening of the compressing force the spherical head 20 is still pressed by a predetermined force but it can still be moved a bit.

Figure 4:
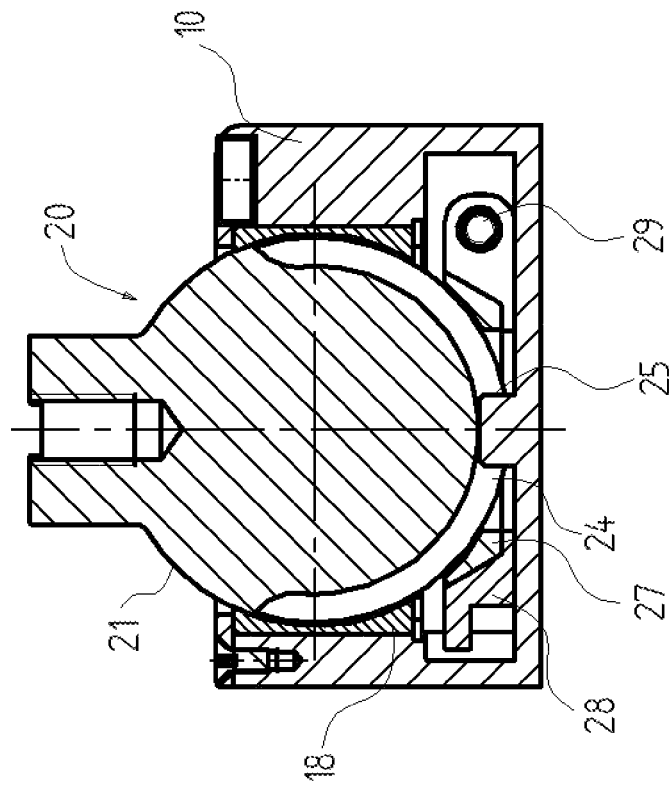
FIG. 4 is the section of the embodiment shown in FIG. 3.
Figure 3:
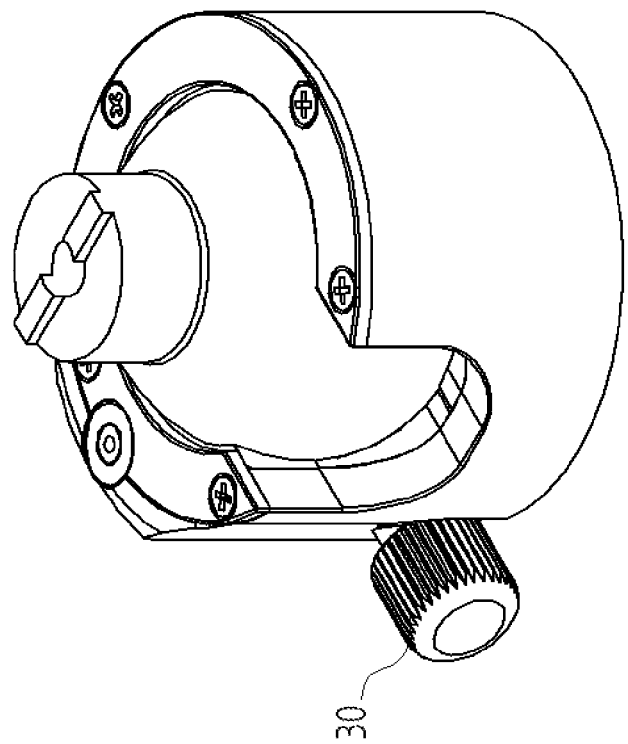
FIG. 3 shows the perspective view of an embodiment that provides an alternative way of pressing the sphere.

In FIGS. 3 and 4 a different embodiment has been shown. For the sake of simplicity only the differences compared to the previous embodiment will be shown. The difference lies in the way of fixing of the adjusted position of the spherical head 20 because in this embodiment there is not slot on the housing 10 but in the lower part thereof a separate sphere-pressing structure is provided. This sphere-pressing structure has a cup-shaped breaking insert 27 which fits to the spherical surface from below and a slotted lifting ring 28 receives the bottom of the insert 27, and the lifting ring 28 can be moved in vertical direction under the control of a threaded bolt 29 shown in FIG. 4 only in section, and a large adjusting button 30 is connected to the bolt 29, and the button 30 can be handled and twisted from the outside of the housing 10. The presence of the sphere-pressing structure does not disturb the guiding of the spherical body 21 along the groove 21 whereas the bolt 29 presses the breaking insert 27 to the body 21 by a pressing force adjusted by a adjusting button 30 and makes its displacement difficult or blocks it completely. In this embodiment prior to the insertion of the spherical head 20 into the cylindrical cavity of the housing first the slotted guiding insert 18 with the spherical cavity should be fitted on the body of the spherical head 20, and only thereafter can the guiding insert 18 be inserted along its cylindrical outer surface together with the spherical head 20 therein in the cavity of the housing and fixed therein.

The groove 24 ensures the guiding of the spherical head 20 when the spherical head 20 is tilted around the horizontal axis together with the device connected thereto so that the base plane of the tilted device remains always horizontal. In FIG. 5 a design of the spherical body 21 has been shown, in which a pair of grooves 24a and 24b are provided thereon, wherein both grooves have vertical central planes which are normal to each other and they meet and cross each other at the bottom point of the spherical head 20 when it is in its base position, i.e. the intersection is at the stud 25. In this base position the user can decide in which direction he is willing to tilt the spherical head 20 i.e. he can choose which of the grooves 24a or 24b should guide the stud 25. The advantages of such a solution are apparent for a skilled photographer.

Reference is made now to FIGS. 6 to 8 in which the head assembly corresponds basically to the embodiment shown in FIGS. 1 and 2 but this embodiment provides a further function, namely the system with two degrees of freedom can be easily changed to have three degrees of freedom i.e. in case of need the spherical head 20 can be made adjustable in all directions without any limitation. In the previously described embodiments the head assembly was adjustable with two degrees of freedom because the stud 25 was fitted in the groove 24, as shown in FIG. 6 and the so established guiding allows the turning of the spherical head 20 along the plane of the groove 24. In this embodiment the snug 25 has a lower height and it is surrounded from two sides and from below by a hinge plate 31. The hinge plate 31 has a sloping part 32 shown in FIGS. 6 and 8 which is connected to an actuator sheet 33 that can be moved in a direction normal to the vertical axis 12 (which is horizontal in the drawing) by a button 34 between two stable positions.

In the position shown in FIG. 6 the button 34 is the closest position to the housing 10 and here the stud 25 is supported from below by the upper plane of the hinge plate 31, and the height thereof is sufficient to allow the projection of the stud 25 held thereby into the groove 24 in a sufficient depth.

In the enlarged view of FIG. 8 the button 34 is in its second stable position away from the housing 10 and here the hinge plate 31 has been moved in outward direction that the stud 25 has slipped down along the sloping part 32 and it is limited from below by a deeper plate surface that follows the sloping part 32. By now the upper surface of the stud 25 is outside the range of the groove 24 therefore the previously described guiding cannot prevail anymore and the spherical head 20 can be moved in any direction. The restoration of the guided position the spherical head 20 should be first set into vertical position and the pressing of the button 34 the sloping part 32 will lift the stud 25 and moves it into the groove 24 and from that point onwards the guiding will have again two degrees of freedom.

In FIG. 7 the spherical head 20 is shown when turned into a portrait position i.e. the neck 22 has a horizontal axis.

FIGS. 9 and 10 show an embodiment in which for releasing and restoring the adjustability in two degrees of freedom there is no need of using the sloping path shown in FIGS. 6 to 8 that moves the stud 25 out or in the groove 24 and there is no need for the button 34 either that makes that adjustment possible as a further adjustment element but this function i.e. the changing of the degree of freedom can be carried out by the user in a simple way without the need of having a separate adjustment assembly.

The embodiment shown in FIG. 9 corresponds basically to that shown in FIG. 4 the difference lies only in the way how the stud 25 is fixed and in the profile of the groove 24. In the enlarged sectional view of FIG. 10 this structure can be observed in a better way. In this embodiment a disc 2 is fixed to the bottom of the housing 10 that forms the base of the assembly. In the bottom of the housing 10 in central position a through going vertical bore 3 is provided that has a diameter equal to the outer diameter of the stud 25 in which it guided by loose fitting. In the interior of the stud 25 a closed end axial bore I provided for receiving a spring 4. The upper end of the spring 4 abuts to the end of the bore and its other (lower) end to the disc 2. The spring 4 presses the stud 25 in upward direction i.e. towards the spherical body 21. A further difference lies in that in this embodiment the upper end of the stud 25 is curved preferably has a spherical shape. The profile of the groove 24 is conforming to the profile of the end of the stud 25.

In the position shown in FIG. 9 the end of the stud 25 fits in the bottom of the groove 24 and the spherical head 20 can be moved relative to the housing 10 with two degrees of freedom, i.e. it can be freely turned around the vertical axis 12 and around the horizontal diameter of the sphere which is normal to the plane of the drawing it can be turned only along the groove 24.

In case the user of the head assembly wished to move and adjust the device in a different direction which would be blocked by the guiding then he has to tilt the spherical head 20 with the attached device with a force higher than a threshold around an axis normal to the plane of the drawing, and in this case the wall of the groove 24 will press the curved head of the stud 25 in lateral direction and this pressing force will have a downward component the presses the stud 25 in downward direction against the biasing force of the spring 4 as long as the stud 25 will get fully pressed in the bore 3 when it cannot block the lateral movement of the wall of the groove 24, whereby the spherical head 20 can be adjusted in any direction with three degrees of freedom. FIG. 10 shows this position when the head of the stud 25 is pressed against the outer surface of the body 11.

If the user wishes to restore the limitation in to degrees of freedom, the assembly should be moved in vertical position (in which the axis 12 is vertical) and when the groove 24 moves in opposite position with the stud 25 then the biasing force of the spring 4 will automatically move the stud 25 in the groove 24 and the position shown in FIG. 9 will be restored. It has been experienced that by the appropriate adjustment of the biasing force of the spring 4 and of the profile of the head of the stud 25 a very fine and at the same time definite solution can be obtained that can be used without the need of any separate handling element.

In FIGS. 11 to 16 a few further embodiments of the invention are shown which provide a further function. For the necessity of this function it has to be understood that the main objective of the connection element connected to the threaded bore 23 in the neck 22 of the spherical head 20 is to hold and adjust the position of a camera or other optical device that can be large and have a higher weight. The center of weight of the device lies always away from the center of the spherical head 20, therefore when its position is adjusted then the force required for the fixing of the position will be the higher the larger the angular difference of the position closed with the vertical direction is because the weight of the device acts with a torque on the spherical head 20 that depends on the tilting angle. Here not only the position fixing will become more difficult in the function of the tilting angle but this torque tends to turn the device and the sphere in downward direction. The torque that depends on the tilting angle is compensated by the embodiments shown in FIGS. 11 to 16 by providing a counter torque that depends also on the tilting angle.

For the torque compensation of the embodiments described so far in which the housing 10 is attached to the stander and the spherical head 20 hold the optical device the possibility is provided by the fact that the interior structure of the spherical head 20 does not affect the basic function i.e. the adjustment with two degrees of freedom, thus the body 21 can be designed to have a hollow interior. In FIG. 12 the section plane passes through the middle of the groove 24 and in this embodiment the spherical head 20 has an internal cavity 35 that crosses the groove 24. Because the internal cavity 35 extends in normal direction to the plane of movement defined by the groove 24 the shown structure of the spherical head 20 cannot affect the adjustability in two dimensions and at the same time it permits the positioning and operation of the structures described below.

The design of the stud that ensures guiding in the groove is different from those shown earlier. In the embodiments shown in FIGS. 11 to 14 a guiding shaft 36 is used which is fixed in the housing by a force fitting connection and it is not terminated at the bottom of the groove 24 but it has a stem 37 provided with a central bore which extends in the inner cavity 35 to a certain extent. In the middle of the neck 11 of the spherical head 20 an axial threaded bore 44 is provided and the inner end thereof is continued by a narrower bore 38 that extends till the top of the inner cavity 35. In the inner cavity a spring 39 is arranged that has two stems 40, 41 fall substantially in the same line and has a spiral spring body 42. The upper stem 41 is inserted along a given length in the axial bore 38 and its upper end abuts a pin 43 threaded into the threaded bore 44. The lower stem 40 of the spring 39 is fitted in the central bore of the stem 37 of the guiding shaft 36.

The assembly design in this way can be moved around the horizontal axis only along the groove 24 i.e. in any direction of the double arrow 45. During displacement the threaded bore 44 and with it the upper stem 41 of the spring 39 will be displaced, while the lower stem 40 is kept by the fixed stem 37 in the vertical direction. The shape of the spring 39 will get distorted according to the tilting angle and exerts a counterforce that acts against the tilting, and with appropriate dimensioning it can generate a counter torque that has an opposite sense than the aforementioned torque which increases with the increasing angle of tilting and the user will only notice that for moving the device held by the assembly always the same displacement force is required and the adjustment can be carried out easily even in the tilted position. The shape of the inner cavity 35 should be designed in such a way that it cannot block the bending of the spring body 42. The spring 39 should be inserted through the groove 24 into the bore 38 before the insertion of the spherical body 21 and during this insertion step it has to be ensured that the guiding shaft 36 be fitted in the groove 24 and the lower stem 40 of the spring 39 has to be pushed into the central bore of the stem 37.

FIGS. 13 and 14 show a different constructional solution for compensating the torque. In this embodiment the stud 46 that is guided in the groove 24 can be fixed to the bottom of the housing by means of a releasable connection provided by a screw 47, and the stud 46 has an upper stem 48 provided with a threaded axial bore open at the upper end. A coil spring 49 surrounds the outer portion of the stem 48 which abuts a screw having a large head 50 and the spindle of the screw is threaded in the inner threaded bore of the stem 48. The inner end of the coil spring 49 is supported through a washer to the bottom wall 52 of the inner cavity 51 of the spherical head 20.

When the spherical head 20 is moved away from its vertical base position in any direction of the double arrow 45 the distance between the stud 46 and the head 50 fixed to the stem 48 of the stud 46 remains constant. At the same time depending on the tilting angle the distance between the lower support of the coil spring 49 defined by the lower wall surface 62 and the head 50 that supports it from above will change, namely will decrease. This happens because the wall of the cavity and the outer profile of the sphere are not concentric. The compression of the coil spring 49 acts against this decrease and this provides the counter torque that depends on the tilting angle.

FIGS. 15 and 16 show an improved version of the previous embodiment in which the friction between the lower end of the coil spring 49 and the lower limiting wall of the cavity 51 is decreased by the insertion of two bearings 53, 54. As a further difference from the previous embodiment a transversal support member 55 was positioned in the interior of the cavity 51 on the stem 48 of the stud 46, and the inner rings of the bearings 53, 54 are supported by respective shaft that form part of the support member 55. Otherwise the design is the same with that of the previous embodiment. When the spherical head 20 is tilted from the vertical direction defined by the groove 24 the wall surface 52 of the cavity 50 gets displaced compared to the stationary bearings 53, 53 and this is followed by the displacement of the outer rings of the bearings 53, 54. In this way there will be no slippage. As a consequence that the length of the coil spring 49 decreases with the tilting angle the generated counter force acts against the angular displacement, and the so obtained counter torque compensates the dipping of the optical device and ensures balance during the adjustments.

Reference is made now to FIGS. 17 to 19 which show a further highly preferred embodiment of the invention. In spite of its small size this solution makes the leveling of the head assembly possible and it does not require that the bottom surface of the housing 10 together with the stander that supports the housing be set to horizontal plane. For understanding the operation of this embodiment the connection between three constructional parts namely the housing 10, a guiding cup 65 that can be connected to the housing 10 and a biasing element 66 positioned under the guiding cup 65 should be understood. In the internal cylindrical cavity of the housing 10 slightly under the lower end of the guiding insert 18 an abutment shoulder 67 is provided.

The guiding cup 65 has a central spherical section provided with a central opening and an outwardly bent horizontal rim 68 and the outer edge of the rim 68 abuts the shoulder 67. Following the insertion of the guiding cup 65 in the position shown in the drawing a support ring 69 is placed that prevents the cup 65 from falling down.

The biasing element 66 is placed under the guiding cup 65 and the biasing element 66 has an upper spherical support and pressing surface that has a shape fitting to the spherical bottom surface of the central part of the guiding cup 55. From the middle of the biasing element 66 a guiding stud 70 extends out which has a task similar to the task of the guiding studs 15, 36 and 62 shown in the previous embodiments, i.e. among other tasks it guides and limits the displacement of the spherical head 20 along the groove 24. In addition to that an upper section with smaller diameter extends in the groove 24 and this section is surrounded by a cylindrical sleeve 71 biased from the bottom by a spring 72. The falling out of the sleeve 72 is prevented by a screw 73 fixed in the upper end of the guiding stud 70. In this embodiment the groove 24 is much deeper as in the previous embodiments which can be seen in the sectional view of FIG. 17.

A pressing assembly 74 with and eccentric shaft is positioned under the bottom of the biasing element 66. For the sake of preserving visualization the details of the pressing assembly 74 have not been shown in FIG. 17 except the shaft on the outer end of which an adjustment button 75 shown in FIG. 18 is mounted.

For completing the description of the structure of this embodiment a through bore is provided in the neck 22 of the spherical head 20 which extends in parallel with the axis 12, and an adjusting rod 76 is inserted in this bore, and under the upper head part of the rod 76 a cylindrical spindle 77 is provided that has a smaller diameter than the bore, and to the lower end of the spindle 77 a spherical head 78 is coupled through a narrow and short pin, and the diameter of the spherical head 78 is the same as that of the cylindrical spindle 77 and the diameter of the bore of the sleeve 71. The cylindrical spindle 77 is surrounded by a spring 79 and its lower end is supported by the lower shoulder of the bore and its upper end abuts the bottom of the head of the adjusting rod 76. The adjusting rod 76 has a pressed position which can be seen in the enlarged detail of FIG. 19, and a released position when the spring 79 has moved the adjusting rod 76 in this basic position shown in FIG. 17.

In FIG. 18 it can be seen that on an upper deepened portion of the spherical head 20 a leveling bubble 80 is arranged which has a plane normal to the axis 12 which is required for the leveling.

The operation of the spherical head assembly shown in FIGS. 17 to 19 comprises preferable two independent steps. In the first step the vertical direction of the axis 12 should be adjusted. In case the upper plane of the stander that holds the bottom of the housing 10 is not horizontal, then in the first step by using the adjustment button 75 and the connected pressing assembly 74 the previously provided pressure between the biasing element 66 and the guiding cup 65 should be released, whereby the angular position of the biasing element 66 can be adjusted within given limits. The limits are defined primarily by the diameter of the central opening of the guiding cup 65. Because the upper plane of the stander does differ largely from the horizontal plane it is sufficient if the adjustment range is within ±25°-30°.

In this loosened position the upper end of the adjusting rod 76 that extends out from the neck 22 is pressed whereby the lower end thereof moves in the position shown in FIG. 19, in which the cylindrical spindle 77 and the spaced spherical head 78 will both be in the bore of the sleeve 71. In this position the adjustment of the position of the neck 22 is followed by the biasing element 66, and the axis 12 can be adjusted in the vertical position by using the leveling bubble 80. Following of this adjustment by turning the adjustment button 75 and by using the pressing assembly 74 the biasing element 66 is pressed to the guiding cup 65 and the rim 68 of the guiding cup 65 will get pressed to the inner shoulder 67 of the housing 10. This will have the result that the housing 10, the guiding cup 65 and the biasing element 66 will get into a rigid connection and the direction of the axis 12 will be vertical, and the guiding of the guiding stud 70 in the groove 24 allows the turning of the spherical head 78 only in the vertical plane. It is important to note that the pressing described here does not affect the connection between the housing 10 and the spherical head 20.

The second adjustment can take place as described earlier, i.e. the spherical head 20 can be tilted in the range defined by the groove 24 or can be turned around the vertically positioned guiding stud 70. This is made possible that following the release of the adjustment rod 76 it returns to its basic position shown in FIG. 17 and the spherical head 78 allows that the axis of the adjustment rod 76 (and with it the neck 22) close an angle with the vertical direction. The presence of the adjustment rod 76 will not prevent the previously described adjustment with two degrees of freedom. In any adjusted position the spherical head 20 and the attached optical devices can be fixed by compressing the slot 14 of the housing 10 with the turning the adjustment head 15 because the housing 10 compresses the guiding insert 18 and presses it on the spherical head 20.

For the sake of better visualization in FIGS. 17 to 19 the previously described torque compensation structure was not shown, however, the use of such a structure is possible also in this embodiment.

Reference is made now to FIGS. 20 to 24 in which an embodiment of the spherical head assembly according to the invention can be seen with a basic position turned by 180° compared to the previous embodiments. In the previous embodiments the bottom of the housing 10 of the assembly (or a so called base plate not shown in the drawing but attachable to the housing bottom) was attachable to a stander not shown in the drawing (being typically a tripod), and the support for the holding of the optical and/or electronic device could be attached to the upper part of the neck 22 of the spherical head 20 in a releasable way.

The assembly shown in FIG. 20 has a spherical head 100 that has a base 101 instead of the neck 22 described in the previous embodiments and the base 101 has a planar bottom and it conically narrows in upward direction not to prevent adjustability of the support assembly to be described later. In the bottom of the base 101 a threaded bore is provided (not shown in the drawing) and this makes possible the attachment of the assembly on the top of the tripod as a stander. The spherical head 100 has a spherical body 99 which is fixed on the base 101, and the body 99 has a vertical central axis 102 which should be set preferably to vertical position during use, and a short cylindrical stud 103 is extending out from the top of the body 99 and its axis falls in the extension of the axis 102, and the role of the stud 103 is the same as that of the stud 25 shown in FIGS. 2, 4 and 6. The stud 103 can be made also as shown in FIGS. 9 and 10.

FIGS. 21 and 22 show a bracket 105 that has parallel side walls made from a resilient plastic material and which performs the role of the guiding insert 18 shown in the previous embodiments. The difference lies in that the bracket 105 has two planar side surfaces 106, 107 which symmetrically surround the largest diameter of the sphere, and between the sides an inner cavity is provided and this is formed as a spherical segment that fits to the diameter of the spherical head 100. The height of the spherical segment in the bracket 105 is greater than the radius of the spherical head 100 therefore it can be positioned on the spherical head 100 only after a resilient deformation. The size has been chosen in such a way that the bracket 105 can be fitted on the spherical head 100 with its resilient deformation i.e. within the deformation limit. In the inner spherical segment of the bracket 105 a groove 108 is provided which extends between the ends of the side surfaces 106, 107, and the width of the groove 108 fits to the outer diameter of the stud 103 and has a sufficient depth to receive the height of the stud 103. The stud 103 and the groove 108 limits and guides the displacement of the bracket 105 with respect to the spherical head 100 as in the previous embodiments the spherical head 20 was guided relative to the housing, but here the role of the two fitting element has been interchanged and the spherical head 100 has no groove at all.

The outer profile of the bracket 105 as shown in FIG. 22 is such a circular arc between the two limiting walls 106, 107 which are continued in tangential direction in two parallel linear sections 109, 121 having both vertical surfaces. The outer wall of the bracket 105 is a partially curved then in the end sections planar surface that is normal to the limiting side surfaces 106, 107 which are connected thereby.

FIG. 23 shows a support member 110 that fulfills the same role as the housing 10 in the previous embodiments, but this time it is not cylindrical but a rigid member limited by two spaced parallel walls and it has a curved interior and a partially curved outer surface and has an internal nest 120 that exactly fits to the outer surface of the bracket 105 and which can be inserted therein from below. In FIG. 23 only one of the two walls i.e. wall 111 can be seen because the other wall is covered.

FIG. 24 shows this embodiment in assembled state. In the first assembling step the bracket 105 will be pressed to open within the flexibility limit and it is pushed on the spherical head 100 so that the stud 103 extending out of the spherical head 100 should accurately fit in the groove 108 provided in the interior of the bracket 105. Then the bracket 105 together with the spherical head 100 embraced thereby is pulled from below into the internal nest 120 of the support member 110, and the bracket 105 is then secured from falling out by attaching respective closure plates 112, 113 (shown in FIG. 21) to the bottom of the support member 110 by screws. FIG. 21 shows the fixing screws 114.

Reference is made again now to FIG. 23 in which we can observe that the support member 110 has an upper horizontal plate 115 and from the middle thereof in the extension of the axis 102 a threaded bolt 116 is extending out which renders the attachment of a camera, video recorder or other optical or electronic device to the upper plate 115 of the support member 110. The lower end of the threaded bolt 116 is connected to a flat wide adjusting disc 117 which fits in a gap made in the upper part of the support member 110 and its diameter is higher than the width of the support member 110 and has a roughened outer wall therefore it can be used to turn the threaded bolt 116 and to connect or disconnect the camera.

On the spherical head 100 which is fixed at the base 101 the support member 110 can be adjusted in any position around two axes. Around an axis normal to the axis 102 turning is possible only in the plane that includes the axis 102 along the groove 108 i. e. which is a tilting movement. The guiding does not prevent turning around the axis 102. The support member 110 can be fixed in any adjusted position. For this purpose at a side of the support member 110 an adjusting bolt is used which is thread in a nut (not shown) and it has a large preferably knurled adjusting button 118, and in the inner end of the bolt a pressing plate 119 is provided that fits to the outer surface of the bracket 105. In any adjusted position by using the adjusting button 118 and its pressing plate 119 the position of the support member 110 can be fixed relative to the spherical head 100. By loosening the pressure the position of the support member 110 can be adjusted again.

The sectional drawing of FIG. 25 shows well the internal design of the assembly. FIG. 25 also shows how the groove 108 made in the interior of the support member 110 surrounds the stud 103 provided on the top of the spherical head 100, and at the respective sides of the stud 103 respective springs 122, 123 can be arranged, and the outer ends of the springs 122, 123 abut respective closure members held and fixed by the closure plates 112, 113 and their inner ends are supported by the stud 103. When the support member 110 is turned around a horizontal axis normal to the plane of the drawing in any direction, then the rear one of the springs 122, 123 counted in the direction of the turning will be compressed, and the compression force increases proportionally with the degree of the turning. In this way this embodiment also has a simple possibility for the compensation of the titling torque.

In the embodiments shown in FIGS. 20 to 25 it has been supposed that the horizontal position of the base 101 could be ensured by the adjustment of the tripod. If this embodiment is compared with those described earlier, it can be understood the apart from the fact that in this case the position of the spherical body 100 is fixed and it is the support member 110 (which corresponds to the housing of the previous embodiments) that constitutes the adjustable part and holds the camera, the adjustability of the position, the position fixing by a single button and the keeping of the vertical plane does not differ from corresponding properties of the previous embodiments.

Reference is made now to FIGS. 26 and 27 in which the functions of the embodiments shown in FIGS. 20 to 25 have been complemented with a leveling function, i.e. when the upper plane of the tripod and in this way the plane of the base 101 was not horizontal, how can the position of the axis of the stud 103 be adjusted in vertical position.

This embodiment differs from that shown in FIGS. 20 to 25 in that the body 99 of the spherical head 100 of the previous embodiment was made by a single piece with the base 101. In the embodiment shown in FIGS. 26 to 27 the spherical head consists of two parts which can be turned relative to each other with three degrees of freedom, namely of a spherical shell 124 and of a slotted inner sphere 125 inserted and fitted in a spherical cavity of the shell 124. The base 101 is the downwardly widening conical bottom part of the slotted inner sphere 125.

The stud 103 extend out from the top of the spherical shell 124, and its role is the same as described in the previous embodiment and it fits in the groove 108 of the bracket 105 which is arranged in the interior of the support member 110. At the lower part of the spherical shell 124 a cylindrical bore is provided that extends parallel with the axis 102 in which a guiding insert 126 is placed that has an outer cylindrical surface and an internal spherical cavity that fits to the slotted inner sphere 125. The guiding insert 126 is similar to the guiding insert 18 shown in FIG. 2 and has an identical role and it is also fixed at the bottom by tow closure plates. In the interior of the slotted inner sphere 125 an obliquely extending slot 127 is provided and the width thereof can be slightly changed by the pressing of a threaded adjustment bolt 129 fitted in a threaded bore provided in the outer one 128 of the two separated parts. When the slot 127 is forced to open by the adjusting bolt 129, then the slotted inner sphere 125 gets pressed against the inner wall of the spherical shell 124 and this will be rigidly connected to the slotted sphere 125 and with the base 101. When the adjustment bolt 129 is loosened, the position of the spherical shell 124 can be changed in any direction with respect to the slotted inner sphere 125 which renders the adjustment of the axis 102 and of the stud 103 in vertical direction. On the elevation view of FIG. 26 it can be seen that in the body of the spherical shell 124 at a lateral part a nest 130 is provided which is open from above into which a leveling bubble 131 can be placed that is also visible from above. By means of the labeling bubble 131 the spherical shell 124 can always be adjusted in horizontal position independent from the plane of the base 101. Following the rigid interconnection of the spherical shell 124 and the slotted inner sphere 125 the support member 110 which holds the bracket 105 can be adjusted with two degrees of freedom in the same way as it was explained in connection with the previous embodiment.

The head assembly according to the invention even in its simplest embodiment allows to be turned around two mutually normal planes in compliance with the user's basic needs and to fix the adjusted position with a single handling element in a comfortable way and to loosen the fixed connection by any of the ways designed in the housing 10. In case of need or demand the assembly can be complemented with optional elements by which the limitations of the tow dimensional movements can be terminated and a three-dimensional adjustment will be possible, and the fixing and loosening of that adjustments can be made by the same handling element which is used in case of two dimensional adjustments. The change of the degree of freedom can be solved by using a separate handling element but also with the way shown in FIGS. 9 and 10 when there is no need of any additional handling element. In case of further need it is possible to retain the previous options or without them to the compensation of the tilting torque that increases with increasing tilting angle. Finally, in case where the plane of the stander is not horizontal or cannot be leveled to be horizontal it is possible to adjust the horizontal position by a single handling element which leveling does not affect the adjustability with two degrees of freedom described earlier. The solution according to the invention is not limited to any one of the exemplary embodiments described and shown. The support member 110 can be made e.g. from two parts placed above one another of which only the part should be flexible which should be placed on the spherical head 100 and the outer rigid part should ensure stability and the other one the placement on the spherical head. In that case the stud 103 should extend into a groove mad in the outer rigid part.

The invention claimed is:

1. A substantially spherical head assembly for attaching an optical and/or electronic device to a support with an adjustability of the position of the device in at least two degrees of freedom, having an initial position in which the device is set to a horizontal or almost horizontal base position, wherein the substantially spherical head assembly has a first part which can be connected and fixed to the support in a releasable way and a second part which is provided with a support element for the releasable connection and holding of the device, and one of the two parts comprises a substantially spherical head that has a body which has at least in part a substantially spherical segment, and the other part comprises a substantially spherical cavity forming a concave surface to match the substantially spherical segment on the substantially spherical head, wherein both said substantially spherical segment and said substantially spherical cavity comprise in a matched position a common substantially vertical equatorial central plane of an imaginary sphere from which they are forming a portion, and the substantially spherical cavity encircles the substantially spherical segment at least in part and is fitted thereto, and the assembly further comprises an adjusting means to provide said adjustability of the position of the device by releasably coupling said substantially spherical cavity to said substantially spherical segment, wherein said adjusting means is coupled to said part which comprises the substantially spherical cavity to allow displacement of said parts relative to each other wherein one of the parts is stationary during the adjustment; and in one of said substantially spherical segment or said substantially spherical cavity a roughly semi-circular groove is provided that has a vertical central plane in said initial position that extends along the diameter of the associated substantially spherical part that is connectable to said device, and a circularly symmetrical stud is provided on said first part, and the stud can be fitted in the groove, and in the fitted position the stud allows and guides the relative displacement of the two parts along the groove, during said displacement, and including the turning of the two coupled parts around the axis of the stud, and the adjusting means presses said substantially spherical cavity and said substantially spherical segment to each other to fix an adjusted position, wherein the shape of said substantially spherical segment remains unchanged in a pressed state.

2. The substantially spherical head assembly as claimed in claim 1, wherein the stud is fixed by a biasing spring in a releasable way in the groove, and against the effect of a sufficiently high force it can be made to disengage the groove and in the disengaged position the two parts can be moved relative to each other with three degrees of freedom.

3. The substantially spherical head assembly as claimed in claim 2, wherein said end portion of the stud is curved.

4. The substantially spherical head assembly as claimed in claim 1, wherein the stud has a cylindrical end portion and the groove has parallel walls in which the end portion of the stud can be fitted, and further comprises a disengagement device which supports the other end of the stud and can be moved in one of two positions by a button that extends out of the assembly and can be moved by hand, in a first position the stud is inserted in the groove, and in the other position the stud is moved out of the space of the groove, whereby the two parts can be moved with three degrees of freedom.

5. The substantially spherical head assembly as claimed in claim 1, wherein for at least partial compensation of the tilting torque generated by the supported device when tilted, a flexible biasing means is provided between the first and the second parts which provides a biasing force that increases with the increase of the relative angular position between the stud and the groove, for the at least partial compensation of the tilting torque that arises under the effect of the supported device when being tilted.

6. The substantially spherical head assembly as claimed in claim 5, wherein the part that comprises said substantially spherical segment is a substantially spherically shaped body that has an internal cavity, and the biasing means comprises a spring placed at least in part in the internal cavity.

7. The substantially spherical head assembly as claimed in claim 1, wherein the first part is a housing that has a cylindrical cavity open from the top and has a vertical axis, and a guiding insert is fitted that has a cylindrical mantle surface and the substantially spherical cavity is made in the interior of the guiding insert, and the stud has an axis lying in the axis of the cylindrical cavity and coupled to the housing, and the second part is the spherical head that has a substantially spherical body forming said substantially spherical segment and being connected to a neck smaller than the cylindrical cavity and extends out from the cylindrical cavity and the support element holding the supported device is arranged at the end of the neck, and the groove is provided in the spherical segment.

8. The substantially spherical head assembly as claimed in claim 7, further comprising a slot provided in the wall of the housing, extending substantially parallel to the axis of the housing and the adjusting means comprises a threaded bolt with an adjusting head cooperating with the bolt that squeeze the parts of the housing separated by the slot and pressing the guiding insert against the substantially spherical body.

9. The substantially spherical head assembly as claimed in claim 7, wherein two grooves are defined in said substantially spherical segment with their respective vertical equatorial planes being transverse to each other and the grooves meet and cross each other at the lower end of the vertical axis of the body corresponding to the position of the stud in the initial position of the substantially spherical head, and the profile of both grooves is the same and matches the profile of the end of the stud.

10. The substantially spherical head assembly as claimed in claim 7, wherein for the adjustment of said initial position in the interior of the housing directly under the guiding insert a guiding cup is arranged that has an intermediate region with a substantially spherical shape and has a rim that abuts a shoulder made in the interior wall of the housing and the guiding cup has an opening in the center, and comprising a biasing element coupled to the outer side of the cup which is opposite to the side facing towards the substantially spherical head, and a connection surface of the biasing element is pressed to the intermediate region of the cup and can be slid along the substantially spherical surface of said region in any direction, and the stud and the biasing element constitute a rigid unit, and a pressing means is provided that can be adjusted from outside of the housing and can press the biasing element to the guiding cup in any momentary position to prevent sliding and to fix any adjusted angular position of the, stud, but said fixed angular position does not affect the movement of the substantially spherical head with respect to the housing.

11. The substantially spherical head assembly as claimed in claim 10, wherein the groove has a depth into the interior of the body of the substantially spherical head to provide space for an inwardly projecting section of the stud, an elongated sleeve surrounds said inwardly projecting section and is supported by a spring, and in the interior of the substantially spherical head in the extension of the axis of the stud a bore is provided for the insertion of an adjusting rod that has an outer end that extends slightly out of the neck of the spherical head, and the internal end of the adjusting rod is designed as a spherical head that can be fitted in an opening of the sleeve, and when pressed the adjusting rod makes a linear connection with the sleeve and when the spring is in a biased state the substantially spherical head-is configured such that, by the angular displacement of the substantially spherical head, the axis of the sleeve-and the axis of the adjusting rod can be bent relative to each other and take any angular position within a given angular range, and on a portion of the substantially spherical head that extends out of the housing a leveling bubble is arranged that facilitates leveling.

12. The substantially spherical head assembly as claimed in claim 1, wherein said first part is a base and has a bottom configured to connect to the support and has a top wherein the stud is provided on the top of the substantially spherical head and extends out, therefrom, and the second part is a bracket that partially encircles the substantially spherical head, and the bracket has an interior designed as a spherical cavity and the groove is arranged in said interior of the bracket, wherein said stud is fitted in the groove for guiding movement of said bracket and the adjusting means is a pressing structure that presses the bracket to the substantially spherical head positioned therein.

13. The substantially spherical head assembly as claimed in claim 12, wherein the bracket is surrounded by a support member that is attached and fixed thereto from the outside, and the attachment to the optical and/or electronic device is provided on the top of the support member, and the adjusting means is a button of a bolt that is arranged at a side of the support member that presses the encircled substantially spherical head from the outside.

14. The substantially spherical head assembly as claimed in claim 12, wherein at both lateral sides of the guiding stud respective springs are arranged in the groove and the ends of the springs are supported by the respective ends of the groove which serve to at least partially compensate the torque that arises when the held device gets tilted.

15. The substantially spherical head assembly as claimed in claim 12, wherein the spherical head is composed of two substantially spherical parts, of which the outer substantially spherical part is a substantially spherical shell that constitutes said substantially spherical segment and holds the stud guided in the groove at the top and the substantially spherical shell has an inner substantially spherical cavity, and the second substantially spherical part is a slotted inner sphere which is arranged and guided directly or through a guiding insert in the interior of the substantially spherical shell and connected to the base, and a pressing member is provided between the slotted portions of the inner sphere that can adjustably press open said slot, whereby the angular position of the spherical shell can be adjusted and fixed relative to said base.

16. The substantially spherical head assembly as claimed in claim 15, wherein at a visible outside portion of the substantially spherical shell, a cut is provided which is open from the top and a leveling bubble is arranged in the cut.

\* \* \* \* \*